(12) United States Patent
Byde

(10) Patent No.: US 8,275,669 B2
(45) Date of Patent: Sep. 25, 2012

(54) AUCTION METHOD AND APPARATUS

(75) Inventor: Andrew Robert Byde, Cardiff (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/197,993

(22) Filed: Aug. 4, 2011

(65) Prior Publication Data

US 2011/0288952 A1  Nov. 24, 2011

Related U.S. Application Data

(62) Division of application No. 11/860,084, filed on Sep. 24, 2007, now Pat. No. 8,019,666.

(30) Foreign Application Priority Data

Oct. 31, 2006 (GB) .................................. 0621603.0

(51) Int. Cl.
*G06Q 40/00* (2012.01)

(52) U.S. Cl. ......... 705/26.3; 705/1.1; 705/36 R; 705/35; 705/37

(58) Field of Classification Search ................... 705/1.1, 705/35, 37, 36, 26, 14, 80, 7, 400; 702/179; 706/45; 713/193
See application file for complete search history.

(56) References Cited

U.S. PATENT DOCUMENTS 5,734,592 A * 3/1998 Cox et al. ..................... 702/179
7,801,769 B1 * 9/2010 Kelly et al. .................. 705/26.1

OTHER PUBLICATIONS

Noam Nisan, Amir Ronen—"Algorithmic Mechanism Design"—Games and Economic Behavior 35, 166-196 (2001).*

* cited by examiner

*Primary Examiner* — John H Holly

(57) ABSTRACT

An automatic system for determining outcomes to an auction process represents the auction by a directed graph and uses a K best solutions algorithm to determine the K best solutions. The system uses a particular graphical representation. Constraints may be included directly into the graph.

18 Claims, 6 Drawing Sheets

AUCTION METHOD AND APPARATUS

The present application claims priority as a divisional under 35 U.S.C. §120 to U.S. patent application Ser. No. 11/860,084, filed Sep. 24, 2007, now U.S. Pat. No. 8,091,666 which is incorporated by reference in its entirety.

FIELD OF INVENTION

The invention relates to apparatus for solving certain problems, including for example auction problems, and related methods.

BACKGROUND

A particular example of a winner determination problem is the winner determination problem for auctions. For example, consider a reverse auction in which a number of sellers provide bids for supplying quantities of a variety of goods and/or services. It would be desirable to have an automatic system capable of providing the best set of bids to accept.

A difficulty may arise in that often there will be some form of constraint on the process so that the winner determination problem is not simply a question of selecting the set of bids which generate the lowest cost. For example, there may be a desire to have at least two suppliers, to avoid over-reliance on a single supplier, but not too many suppliers, to avoid excessive costs in procurement and delivery. It may be very hard to mathematically represent such constraints. For example, it may be very difficult to represent the desire not to have "too many suppliers" since it may not be clear at the start of the auction how many suppliers represents "too many".

RELATED APPLICATIONS

Prior US Applications:
U.S. application Ser. No. 11/232,518 filed 22 Sep. 2005 "Computing A Set of K-Best Solutions to an Auction Winner-Determination Problem" (HP Ref: 200502482) and U.S. application Ser. No. 11/546,042 filed 11 Oct. 2006 "Constraint Satisfaction for Solutions to an Auction Winner-determination Problem" (HP Ref: 200600318).

BRIEF DESCRIPTION OF DRAWINGS

Embodiments will now be described, purely by way of example, with reference to the accompanying drawings, in which.

DETAILED DESCRIPTION

The invention will now be described with reference to a particular example. The particular example is to an auction system, and the example presented relates to a reverse auction, also known as a procurement auction, where a purchaser invites bids to supply a number of different goods or services, which will be referred to as items. In general, there will be S sellers and I such items.

Figure 1:
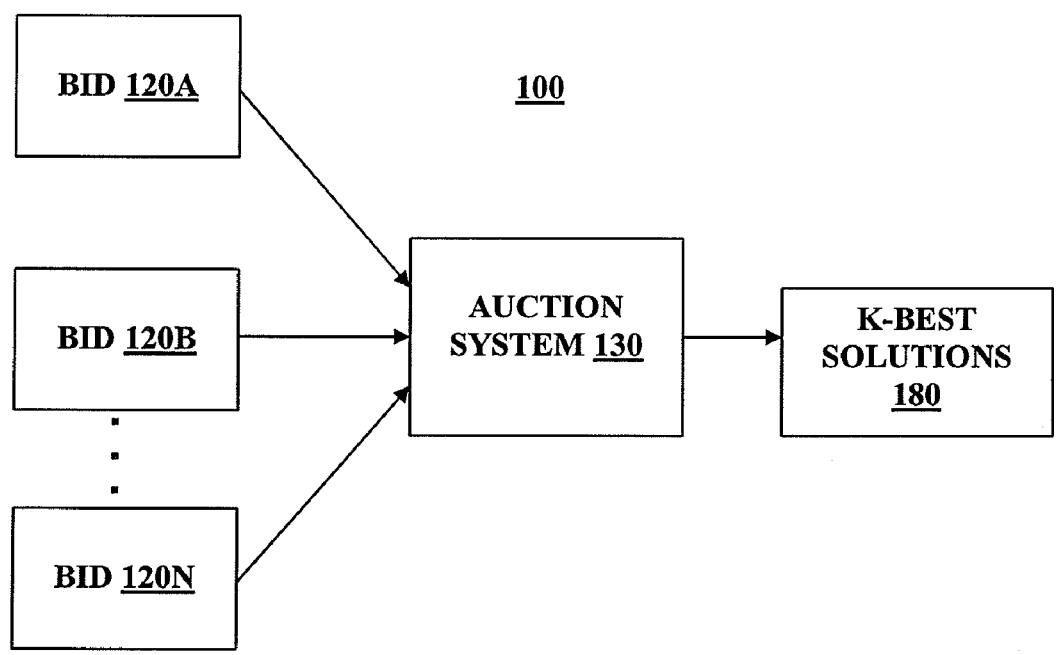
FIG. 1 is a schematic diagram of an auction system according to an embodiment.

The system operates schematically as shown in FIG. 1. A number of bids 120A, 120B, . . . 120N are submitted to the auction system 130, and a number of solutions (greater than one) are output as the k best solutions 180. Each bid indicates a quantity of an item and a cost of the item.

Figure 2:
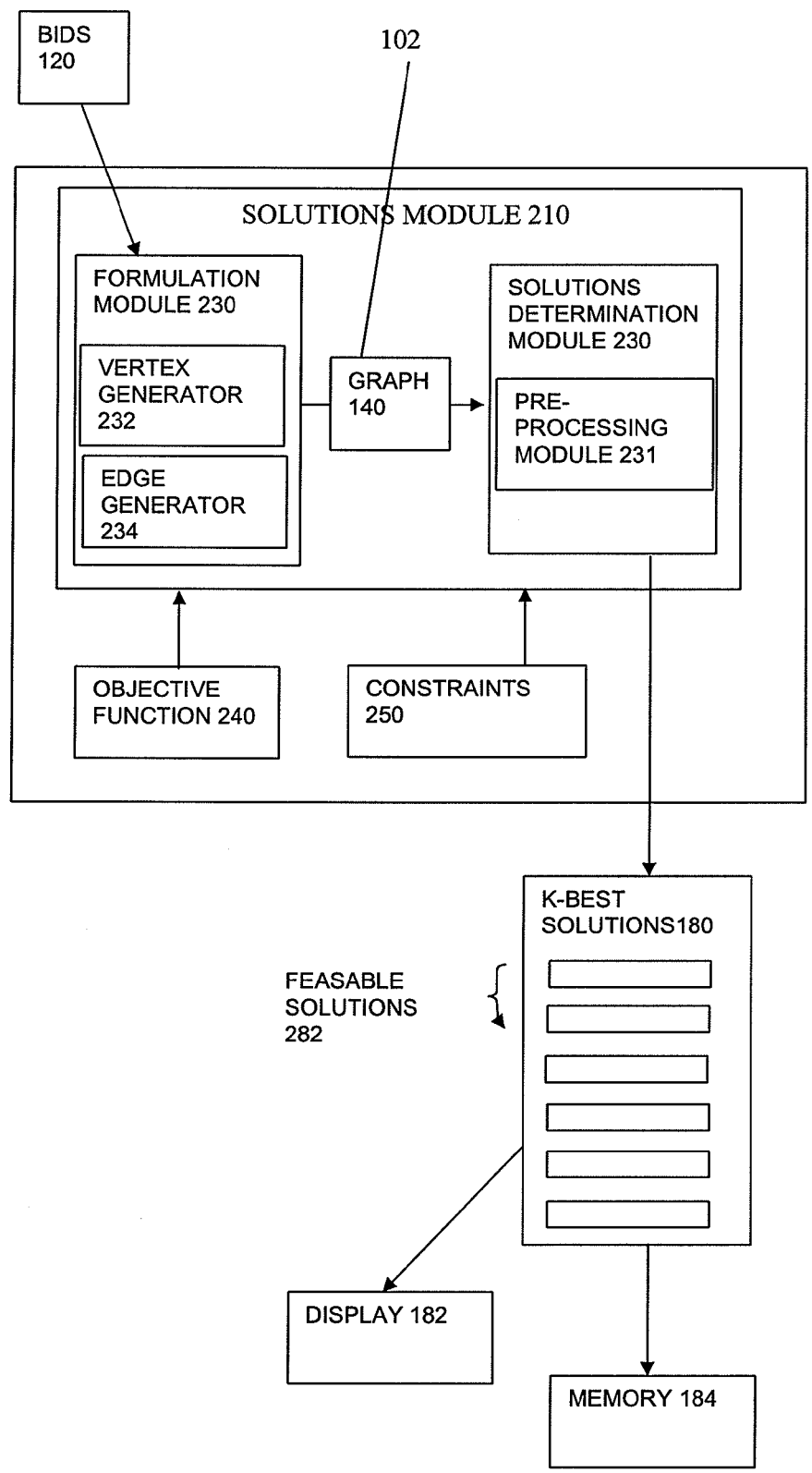
FIG. 2 is a more detailed schematic diagram of the auction system of FIG. 1.

This is illustrated in more detail in FIG. 2, which illustrates the solutions module 210 within the auction system 130. This contains a formulation module 220 for representing the bids as a graph 140, stored on a computer-readable medium and a solutions determination module 230 for determining the solutions 180. A preprocessing module 231 is in the embodiment provided for preprocessing the graph 140 represented by the formulations module. The computer readable medium may be, for example, a memory or a readable disk.

The output may be a number k of solutions 180. The system may also generate subsets of these, such as the subset of feasible solutions 282 that comply with certain constraints. These will be discussed in more detail below.

The output may be displayed on a display 182, output to a computer readable medium 184, or both.

One of the solutions is then selected, and the corresponding set of bids in the path of that solution are accepted and the remaining bids rejected. The suppliers then supply the quantities of the accepted bids and are paid the amounts of the accepted bids.

The auction system 130 also allows the inputs of objective functions 240, for determining the goal of the solutions determination module (for example, lowest cost) and side constraints 250.

There is no obligation that each supplier supplies all of any given item. For example, one supplier may supply half the required number of a particular kind of item, and another the rest. Thus, each item may be subdivided into a number of shares. The number of shares will be denoted Q (for quantiles), and each item may therefore be divided into Q quantiles. For example, if Q=4, there are four quantiles, and each supplier may supply 0, 1, 2, 3 or 4 quantiles of each of the items, representing 0%, 25%, 50%, 75% and 100% of the total requirement for that item.

In this example, each seller provides a number of bids for each possible number of quantiles for each of the items. The bid from the s-th seller for supplying $q_s$ quantiles of the i-th item will be denoted $B_{is}(q_s)$.

It will be appreciated that I, S and Q are integers. Since there are I items, i may take the values 1, 2, 3 . . . I, and likewise s may take the values 1, 2, 3 . . . S and q may take the values 0, 1, 2, 3 . . . Q, since it is possible to supply 0 items.

Given this significant number of bids, the problem is for the buyer to determine the best solution.

The approach adopted in the present invention is to represent this problem as a directed graph.

One version of such an approach has previously been considered within Hewlett Packard. In this approach the problem is broken down into sub-auctions for each of the items, a comparative example, illustrated in FIG. 3. There are two sellers (A and B) and the number of quantiles Q is 2, so that for each item there are two lots. Thus, for each item, the possibilities are that seller A sells both lots, represented as AA, that seller B sells both lots, represented as BB, and that each seller sells one lot, represented as AB.

Figure 3:
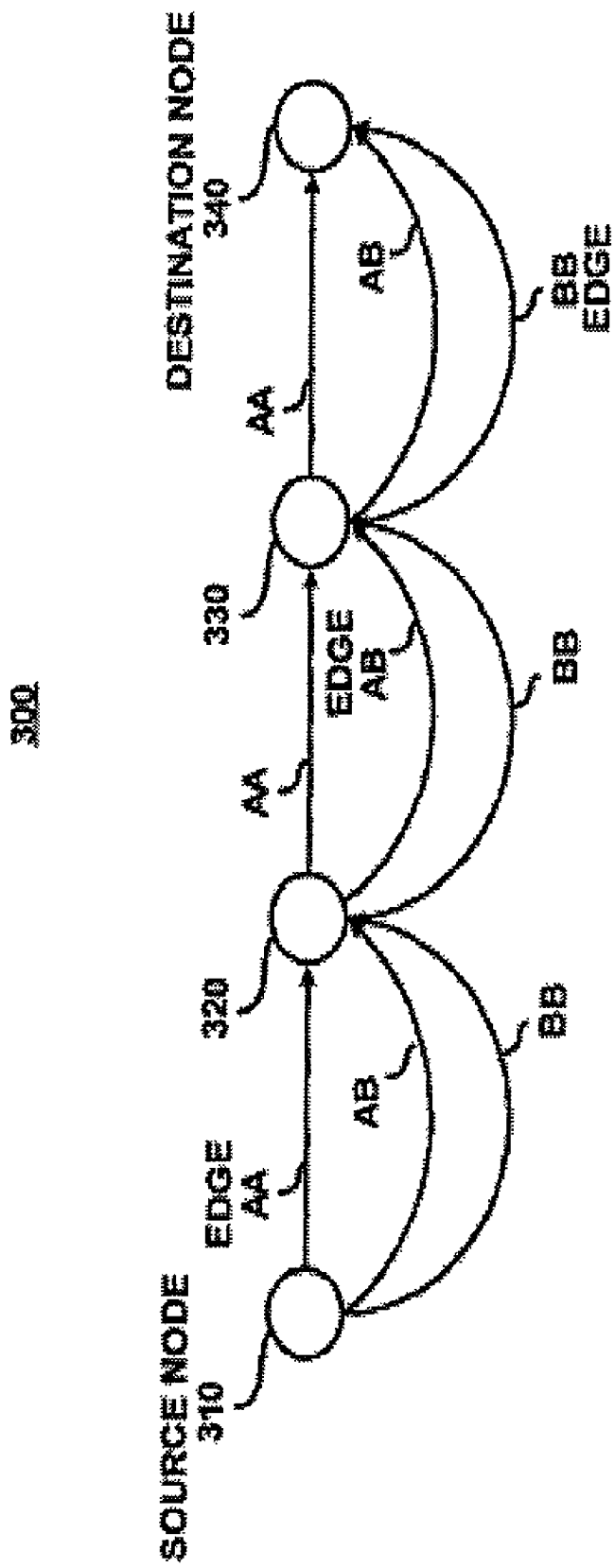
FIG. 3 is a schematic diagram of a graph representation of an auction system according to a comparative example.

The formulation module 220 constructs a graph as illustrated in FIG. 3, with a source node 310, a destination node 340 and a number of intermediate nodes 320, 330. In this case, there are two intermediate nodes, a first intermediate node 320 and a second intermediate node 330.

Each item is represented by a set of edges (the lines in FIG. 3) between two nodes, corresponding to the possible combinations to deliver each item. Thus, graph of FIG. 3 represents three items. The first item is represented by the edges between the source node 310 and first intermediate node 320, and each edge represents one of the three possible ways the two suppliers can supply the product. Similarly, the second item is represented by the edges between first and second intermediate nodes 320, 330, and the third item is represented by the edges between the second intermediate node 330 and the destination node 340.

The length of each edge is then given as the sum of the bids for that edge. For example, the length of the edge AB between source node 310 and the first intermediate node 320 is the sum of the bid of seller A for supplying one unit and the bid of seller B for supplying one unit.

The problem of finding the best combination of bids to accept then becomes the problem of finding the shortest path from the source node 310 to the destination node 340.

In this approach the number of edges between each pair of adjacent nodes, corresponding to each item, can be large. In particular, the number of edges for Q quantiles and S sellers is given by $$N = \frac{(Q+S-1)!}{Q!(S-1)!} \quad (1)$$

For significant numbers of sellers and quantiles, this number can be very large. Accordingly, the inventor has realised that an improved graph can significantly reduce the number of edges.

For each item, instead of a series of parallel edges between adjacent nodes as in FIG. 3, a more complex pattern of edges is adopted between source node $s_i$ 400 and sink node $t_i$ 410, via intermediate vertices 420 labelled (s, q) for s=1, 2, 3 . . . S and q=1, 2, 3 . . . Q. The source and sink nodes correspond to adjacent vertices 310, 320 in the comparative example of FIG. 3.

Figure 4:
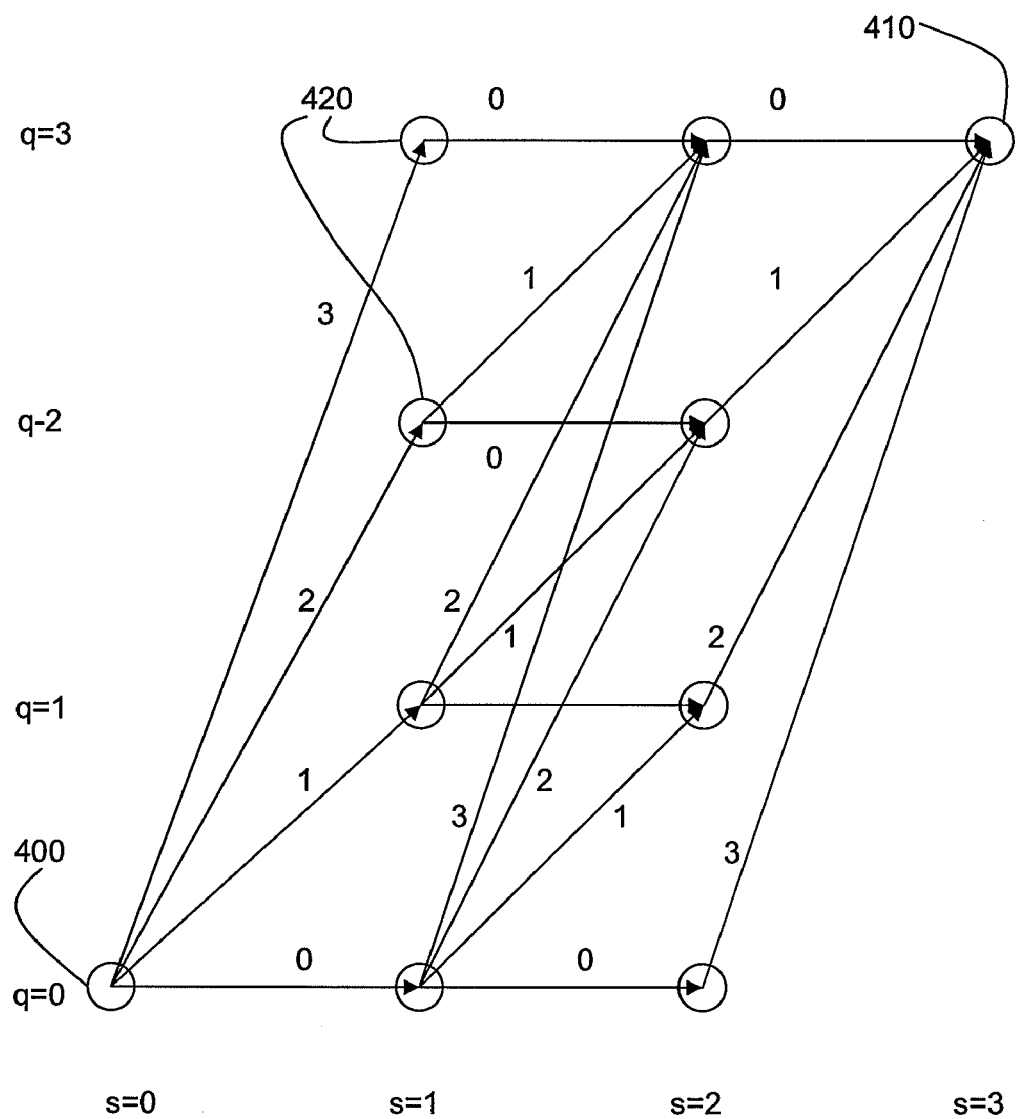
FIG. 4 is a schematic diagram of a graph representation according to an embodiment.

Consider first the specific example as illustrated in FIG. 4, which is for the case of a single item with three sellers and three quantiles (S=3, Q=3). The edges are directed left to right, and are labelled with their lengths.

Each vertex (s,q) represents a situation where the sellers from 1 up to s have supplied their bids and supplied a total of q quantiles. Thus, where each seller s supplies $q_s$ units, $$q = \sum_{1}^{s} q_s.$$

Thus, the vertex (2,1) represents a situation where the first two sellers have in total supplied one unit.

The rows in FIG. 4 are labelled with the values of q and the columns with the seller.

The four edges from starting vertex $s_i$ which may be represented as (0,0) represent the supply from the first seller of 0, 1, 2 or 3 quantiles respectively, and the lengths are the bids for supplying the respective number of quantiles. These edges terminate in the vertices (1,0), (1,1), (1,2) and (1,3) where the second number represents the total number of quantiles supplied.

From each of these four vertices, the edges represent the supply by the second seller of 0, 1, 2, or 3 quantiles respectively. However, it should be noted that if the first seller has already supplied 2 quantiles, the second seller can only supply 0 or 1 since in this example the total number of quantiles supplied is 3. Therefore, there are only two paths from the (s,q)=(1,2) vertex corresponding to the supply of zero and 1 quantile respectively by the second seller.

The set of paths leading to sink $t_i$ (3,3) corresponds to the third seller supplying the remainder of the quantiles required at the corresponding price.

Thus, the different paths from source 400 to sink 410 represent the different ways that the three sellers can supply the three quantiles of the item in question concerned.

Of course, this approach may be used for other numbers of sellers and quantiles.

Expressed more generally and mathematically, the following algorithm may be used to generate the graph for S sellers and Q quantiles for each item.

The source node is $s_i$ 400 and the sink node $t_i$ 410, and intermediate vertices 420 are labelled (s, q) for s=1, 2, 3 . . . S and q=1, 2, 3 . . . Q.

For the first seller, s=1, for each quantile $q_1$ from 0 to $q_1$, an edge is added from the node $s_i$ to vertex (1,$q_1$) labelled $q_1$ and with length $B_{i1}(q_1)$.

For each of the sellers from s=2 to S−1, for quantiles q≦Q and $q_s$≦Q−q, connect the vertices (s−1, q) to (s, q+$q_s$) via an edge of label $q_s$ and length $B_{is}(q_s)$.

For the last seller s=S, connect each vertex (S−1,q) to the node $t_i$ via an edge with label Q−q and length $B_{iS}(Q-1)$.

At first sight, this graph may seem more complex than those of FIG. 3. However, the number of vertices is Q(S−1)+2 for each subgraph (i.e. for each item) and the number of edges is (S−2)((Q+1)(Q+2)/2)+2Q.

Since there are I items, in general, the total number of vertices V is given by $$V=I(Q(S-1)+2) \quad (2)$$

and the total number of edges E is given by $$E=((S-2)((Q+1)(Q+2)/2)+2Q) \quad (3)$$

The total number of vertices is O(ISQ)—that is to say of order (ISQ), and the total number of edges O(ISQ$^2$).

By comparison with equation (1), it may be seen that this polynomial order is much better than the number in the FIG. 3 case, for large Q and S.

The particular graphical representation used can cope efficiently with significant numbers of sellers and of a significant number of quantiles, i.e. wherein the amount of each item can be subdivided into a large number of different pieces. Thus, the use of the representation as recited allows faster and more computationally efficient processing than alternative formulations in these cases.

Figure 5:
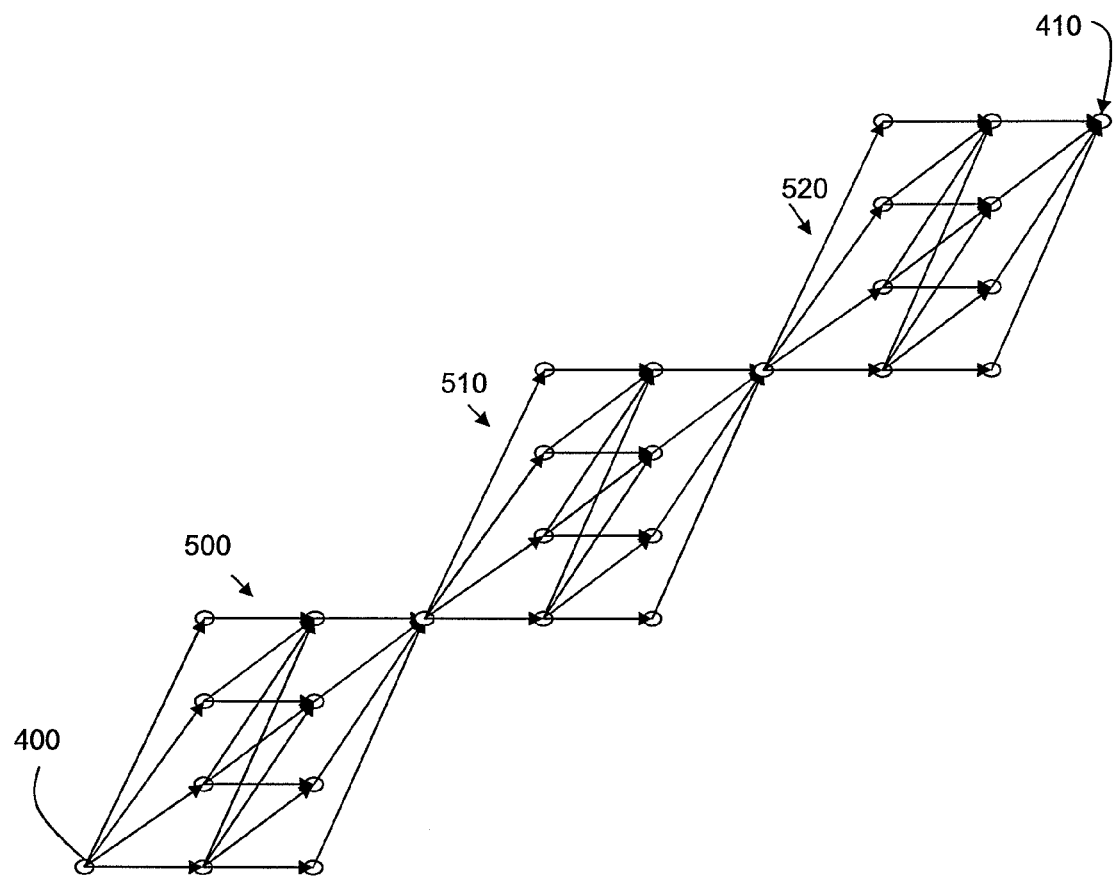
FIG. 5 is a schematic diagram of an alternative graph representation according to another embodiment.

The above description and FIG. 4 relate to a sub-graph for a single item 500 which is chained together with graphs for other items 510, 520 to provide the complete graph as illustrated in FIG. 5.

In an alternative approach the graph may be defined by a single set of rules for all items, rather than for each item separately.

In this approach, there is a vertex for each triple (i, s, q) where i represents an item, s the seller and q the number of quantiles already supplied of by sellers up to and including the s-th seller of the i-the item. For s=S q=Q. There is an extra source node s=(0,0,0) and sink t=(I+1,S,Q).

The graph is defined with edges as follows.
1. Each vertex (i, s, q) is connected to (i, s+1 q+$q_s$) for each s≦S−1 and $q_s$≦Q−q. These are the majority of edges and correspond to the assignment of $q_s$ quantiles of item i to seller s. These edges are labelled $q_s$ and have length $B_{is}(q_s)$.
2. Each vertex in the form (i, S−1 q) is connected to (i, S, Q) for 0<i≦I. These edges correspond to allowing the last seller to supply all remaining quantiles of item i. These edges are labelled (Q−q) and have length $B_{iS}$ (Q−q)
3. (i, S, Q) is connected to (i+1,1,$q_1$) or each 0≦i<I and $q_1$≦Q. These correspond to the assignment of $q_1$ items of the (i+1)—the item to the first seller, and thus represent the linking of the sub-graphs together. These edges have label $q_1$ and length $B_{(i+1)1}(q_1)$
4. (i , S, Q) is connected to t with a single edge of length 0.

The graphs may be represented in the auction system 130 in any convenient way.

After the formulation module 220 has specified the graph, the solutions determination module 230 then determines a plurality (k) shortest paths.

The skilled person is aware of a number of "k—shortest path" (KSP) algorithms which may be used for finding the k shortest paths, and any of these may be used to identify the k best solutions 180 (FIG. 2)

The use of a k-shortest path algorithm instead of just finding the single shortest path has certain benefits. It has been appreciated that the best path according to the algorithm is not always the best path in the real world, since there may be additional constraints or considerations that are difficult to incorporate into the model. For this reason, the provision of a plurality (k) shortest paths allows the user to select from the suitable shortest paths to deal with other constraints, such as a general desire to use no more than a particular number of suppliers, or the desire to take at least some items from one or more preferred suppliers if this can be done without excessively increasing costs.

Such constraints can be very hard for users to capture mathematically. For example, the desire to use a preferred supplier if this can be done without excessively increasing costs requires knowledge in advance of what "excessively" means in this context, which may be hard to know in advance but which is easy for a procurement professional to identify presented with a list of options and their costs.

Referring back to FIG. 2, the solutions determination module can be arranged not just to provide the k best solutions 180 but also subsets of these solutions according to additional criteria determined by side constraints.

These can include features such as the requirement to use or not to use particular combinations of suppliers. The k best solutions 180 are searched to provide the feasible solutions that meet these side constraints, which will be a subset of the K best solutions.

The above embodiments do not code constraints into the model or into the solutions determined by the solutions determination model. The user simply selects suitable solutions from the k best solutions.

However, in other embodiments, which will now be described, some or all of the constraints are incorporated into the graphs so that they are automatically considered by the solutions determination module 230.

In general terms, the same approach is used as in FIG. 5 as described above with a single graph. Each vertex is additionally labelled with an additional index x that can take any of a set of values that will be denoted as the set X which is {*, 1, 2, ... N} where * is a special element of the set, representing the initial state.

Thus, assuming that the set X has a certain number of possible values, each vertex (i, s q) for possible values of i, s and q in the graph of FIG. 5 may be replaced by that number of vertices, labelled (i, s, q, x) for each possible value of x.

The concept is to use the variable x to capture additional details to allow constraints to be modelled within the graph.

For example consider a case where only certain subsets of sellers may be used, for example no more than two sellers. For simplicity, there may be three sellers, 1, 2 and 3 of which no more than two may be selected to supply all items. Each vertex may be labelled with the set of sellers that have already supplied.

In this case the set X may be represented as {*, 1, 2, 3, 12, 13, 23}. * is the situation where no sellers have supplied any units, and each other element represents the sellers that have already supplied. Note that there is no element 123, since this is not permitted by the constraint that there be no more than two sellers. Further, note that the values of X are in this case non-numeric—they represent elements of a set. There is in general no requirement that x is a numeric value.

The source point 400 is labelled with x=*, and each edge as defined above connects (i, s, q, x) to (i',s',q', x') where the variable x' keeps track of how many sellers have supplied. Thus, each edge from the source point (which represent the quantity of the first item sold by the first seller) is to x'={1} except for the case where q'=0, which mean that no items are sold from the first seller, which is to x'={*}.

More generally, an edge from x={1} which represents a sale by the second seller is to the vertex labelled x'={12} since "after" this additional sale both sellers 1 and 2 have supplied.

There are no edges defined from points labelled x={12} which involve supply by the third seller since this is not permitted. Such edges are omitted from the graph.

These omitted edges from the graph mean that there are "hanging" edges which do not form part of any path from source to sink in this embodiment. However, the KSP algorithms can readily cope with this, so alternative embodiments may not have this property.

Figure 6:
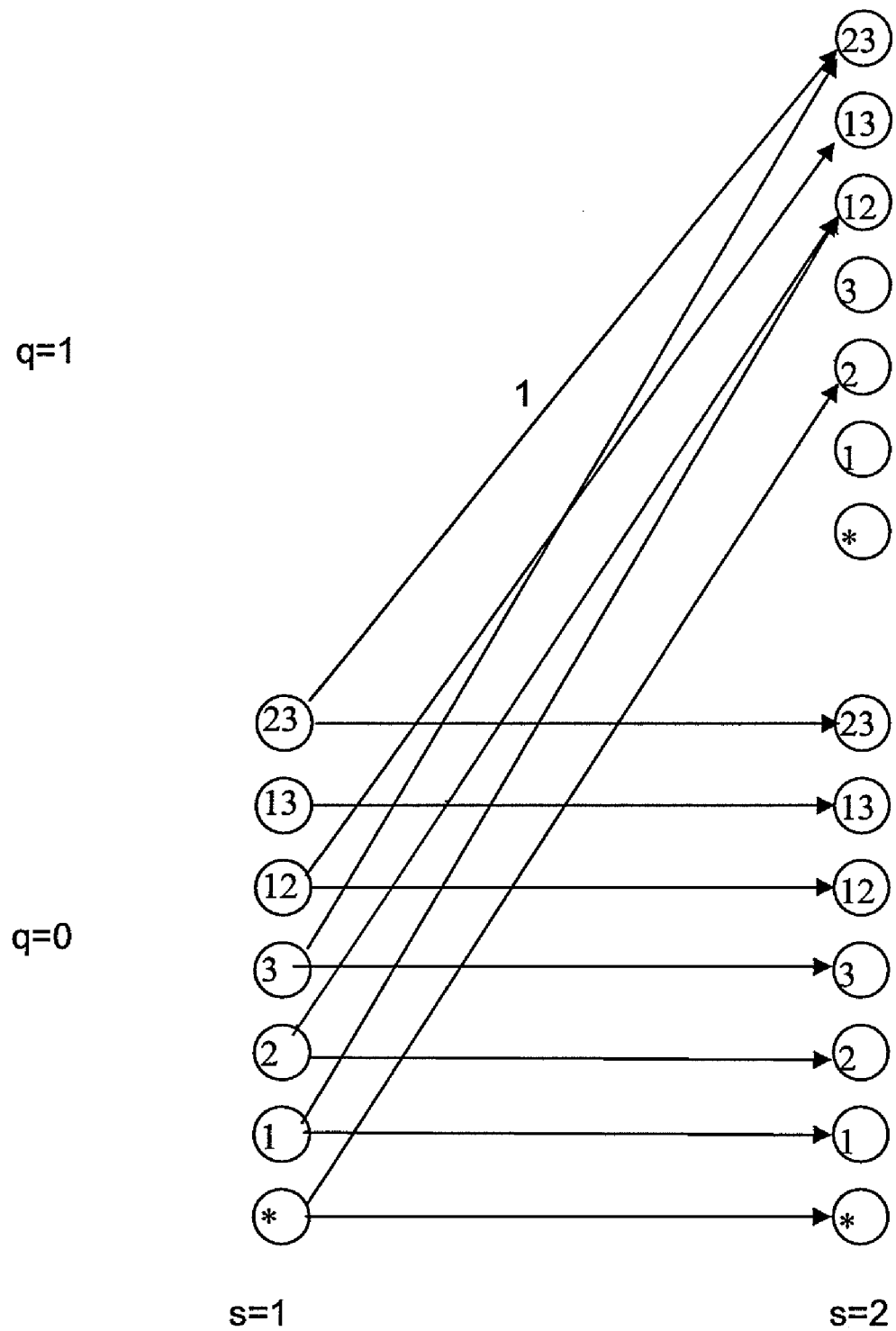
FIG. 6 is a schematic diagram of an alternative graph representation according to another embodiment.

FIG. 6 illustrates part of such a graph. It corresponds to the part starting from a value 1=0 and s=1 representing the supply of either zero or one unit by seller s=2. Each vertex of FIG. 4 is replaced by seven vertices in FIG. 6, corresponding to the seven possible different values of x: *, 1, 2, 3, 12, 13, 23.

The horizontal edges represent the supply of no units by seller 2. The value of x is accordingly unchanged.

The diagonal lines to q=1 represent the supply of one unit by seller 2. Thus, where x={1} at the start, indicating that only seller 1 has supplied any units, x'={12} at the end indicating that sellers 1 and 2 have each supplied at least one unit.

Note that there is no edge from x={13} since this would need to go to the element {123} which is not an element of X. Accordingly, this edge is omitted.

Note that the value x={*} is only relevant for the first sub-graph 500 (as shown in FIG. 5). The subsequent sub-graphs 510, 520 do not require this, since the paths through the first sub-graph 500 always represent supply by at least one of the sellers.

In more general terms, the graph is defined with edges as follows. For completeness, the whole set of rules is given.

The variable x can take values in the set X where X={x: x ⊂ σ' and σ'ϵS} where S is a collection of allowed sets of sellers and σ' is an element of this collection S.
1. Each vertex (i, s, q, x) is connected to (i, s+1, q+$q_s$, x') for each s<S−1 and $q_s$≦Q−q for a particular value of x' except where the edge is omitted as defined below. These are the majority of edges and correspond to the assignment of $q_s$ quantiles of item i to seller s.

x'=x if the edge is labelled 0, x'=x∪{s+1} otherwise. If the edge is not labelled 0 and x' as defined is not an element of X, the edge is omitted.

2. Each vertex in the form (i, S−1,q ,x) is connected to (i, S, Q,x') for 0<i≦I and a particular value of x unless the edge is omitted. These edges correspond to allowing the last seller to supply all remaining quantiles of item i. These edges are labelled (Q−q) and have length $B_{is}$ (Q−q)

Again, x'=x if the edge is labelled 0, x'=xÅ{S} otherwise. If the edge is not labelled 0 and x' as defined is not an element of X, the edge is omitted.

3. (i, S, Q, x) is connected to (i+1,1,$q_1$,x') or each 0≦i<I and $q_1$≦Q. These correspond to the assignment of $q_1$ items of the (i+1)-th item to the first seller, and thus represent the linking of the sub-graphs together. These edges have label $q_1$ and length $B_{(i+1)1}(q_1)$ Again, x'=x if the edge is labelled 0, x'=x∪{1} otherwise. If the edge is not labelled 0 and x' as defined is not an element of X, the edge is omitted.

4. (i, S, Q, x) is connected to t with a single edge of length 0 for those values of x in S. If x is not in S, the vertex is not connected to t.

Note that although in the simple example above for which X={*, 1, 2, 3, 12, 13, 23} all allowed values for x (except *) are in S, this is not necessarily the case. For example, if the constraint was that exactly two sellers need to be suppliers, S would be {12, 13, 23} whereas x can take on any of {*, 1, 2, 3, 12, 13, 23}.

Only paths corresponding to suitable sets for which the sellers comply with the requirement connect the source 400 to the sink 410.

A similar formulation can be used to include quantile thresholds in the graph, i.e. thresholds where there are constraints on the number of quantiles supplied by the sellers.

In this case X is a product of sets of the form {0, 1, 2 ... $T_s$} for each seller s where $T_s$ is a threshold, for example a maximum or minimum value for that seller. x can then be represented by ($x_1$, $x_2$, $x_s$) where $x_s$ for each of s=1, 2 ... S counts the number of quantiles so far assigned to seller s.

To implement a minimum, $x_s$'=min ($T_s$,$x_s$+$q_s$) on a path labelled $q_s$, i.e. a path corresponding to supplier s supplying $q_s$ quantiles. $x_s$ then counts up to the minimum requirement. Any seller already meeting this requirement has $x_s$=$T_s$. Then, only those penultimate vertices (I, S, Q, x) are connected to the sink for which $x_s$=$T_s$ for all suppliers. (Note that $T_s$ can take the value 0 for some suppliers).

To implement a maximum, $x_s$'=$x_s$+$q_s$. Where $x'_s$ is greater than $T_s$ the edge is simply omitted. In this case, all vertices (I, S, Q, x) are connected to the sink.

Thus, by using the above approaches involving the additional vertex label X, some constraints may be incorporated in the graph In the examples above that deliver a plurality of solutions, i.e. the k-best solutions, it is possible for a human user of the system to determine a solution that meets constraints even if the constraints are not mathematically formulated.

It should be noted that the above embodiments are presented purely by way of example.

Please note that the above description is based on the same number Q for all items. However, in alternative embodiments the number of quantiles Q may vary for each item, in which case it may be represented as $Q_i$ for each i from 1 to I.

Further, although the above description describes a reverse auction, exactly the same approach can be used for a normal auction for which the goal is to maximise revenue, by simply representing each bid by either by a negative number or by a constant less the cost of each bid. Thus, instead of the sellers in the embodiments described above, the participants may in fact be buyers.

The representation of the elements may vary. For example, the variable q may represent the percentage of the total supplied, not the number of quantiles.

Further, the bids may not be bids from external suppliers, but they may instead represent the cost of supply of a resource from an internal source. For example, instead of suppliers, each counterparty in the auction may be a computer server that supplies a particular amount of processing of a particular job and the bids represent the cost of that server supplying that amount of processing power. The auction outcome in this case represents the least expensive use of resources to achieve a particular processing goal.

For this reason, the term "counterparty" is used to refer to the participants in the auction —these counterparties may be buyers, sellers or even inanimate objects such as computer servers.

We claim:

1. A method for evaluating auction bids in an auction with I items and S counterparties, where each item i is subdivided into Q units, the method comprising:

accepting a plurality of bids, each bid being a bid $B_{is}$ ($q_s$) representing a cost of a quantity $q_s$ of item i from counterparty s;

generating, by executing a module stored on a non-transitory computer readable medium, a directed graph from a source vertex to a sink vertex representing the plurality of bids;

identifying k shortest paths from the source vertex to the sink vertex, the bids making up each shortest path representing a corresponding solution to the auction-and the k-shortest paths representing the k best solutions, where k is an integer ≧2; and outputting the k best solutions;

wherein the directed graph is defined by a single set of rules for all I items, and includes a plurality of intermediate vertices (i, s, q), wherein:

i represents an item, i=1, 2, ... I;

s represents a counterparty, s=1, 2, ... S; and q represents a number of units already supplied by counterparties from counterparty 1 up to and including counterparty s of item i, where q=0, 1, ... Q.

2. The method according to claim 1 wherein generating a directed graph comprises:

generating the source vertex and the sink vertex;

generating the plurality of intermediate vertices (i, s, q); and generating edges representing each bid, each edge being an ordered edge from the source vertex or one of the intermediate vertices towards the vertex (i, s, q) of length $B_{is}$ ($q_s$), length $B_{is}$ ($q_s$) representing a cost of a quantity $q_s$ of item i by counterparty s.

3. A method according to claim 2, wherein generating edges comprises:

providing an edge of length $B_{is}$ ($q_s$) from each vertex (i, s, q) to (i, s+1,q+$q_s$) for each s<S−1 and $q_s$ ≦Q−q;

providing an edge labeled (Q−q) of length $B_{is}$ (Q−q) from each vertex (i, S−1, q) for 0<i≦I; and providing an edge labeled $q_1$ of length $B_{(i+1)1}(q_1)$ from each vertex (i, S, Q) to (i+1, 1, $q_1$) for each 0≦i<I and $q_1$ Q;

the method further comprising identifying the source vertex as and identifying the final vertex (I, S, Q) as the sink vertex or connecting the vertex (I, S, Q) to the sink vertex with a path of length 0.

4. A method according to claim 2, wherein each vertex is labeled with an additional variable x where x is an element of a set X, so that the vertices are labeled (i, s, q, x), wherein the variables x are used to represent a constraint on the solution.

5. A method according to claim 4, wherein each vertex (i, s, q, x) is connected to vertex (i, s+1, q+$q_s$, x') for each s<S−1 and $q_s$ <=Q−q where x' is an element of X, x' is a function of a rule representing the constraint which determines x' from one or more of i, s, q, s, q' and x; and any edges which do not meet the constraint are omitted.

6. A method according to claim 4 wherein the constraint is that the set of counterparties supplying non-zero quantities is an element of a set S of counterparties and wherein X is given by X={*; x: x ⊂ σ' and σ'∈S } where {*} is a special element, the method comprising:

providing an edge of length $B_{is}$ ($q_s$) connecting each vertex (i, s, q, x) to (i, s+1, q+$q_s$, x') for each s<S−1 and $q_s$ ≦Q−q for a particular value of x' except where the edge is omitted as defined below, where x'=x if the edge is labeled 0, x'=x ∪{s +1} otherwise, and if the edge is not labeled 0 and x' as defined is not an element of X, the edge is omitted;

providing an edge labeled (Q−q) of length $B_{is}$ (Q−q) connecting each vertex (i, S-I, q, x) to (i, S, Q, x') for 0<i≦I and a particular value of x unless the edge is omitted, where x'=x if the edge is labeled 0, x'=x∪ {S} otherwise, and if the edge is not labeled 0 and x' as defined is not an element of X, the edge is omitted;

providing an edge labeled $q_1$ of length $B_{(i+1)1}$ ($q_i$) connecting each vertex (i, S, Q, x) to (i+1, 1,$q_1$,x') for each 0≦i<I and $q_1$ ≦Q where x'=x if the edge is labeled 0, x'=x ∪{1} otherwise, and if the edge is not labeled 0 and x' as defined is not an element of X, the edge is omitted; and providing an edge connecting (i, S, Q, x) to the sink with a single edge of length 0 if and only if x is in S.

7. A method according to claim 4, wherein the constraint is a requirement that one or more counterparties s supply a minimum total quantity $T_s$;

X is a product of the sets (0, . . . , $T_s$) for each of the one or more counterparties s, the rule determining x' is x'=min ($T_s$, x+$q_1$);

and of the vertices (I, S, Q, x), only those vertices for which $x_s$ =$T_s$ for each s are connected to the sink.

8. A method according to claim 4, wherein the constraint is a requirement that one or more counterparties s supply a maximum total quantity $T_s$ and X is a product of the sets (0, . . . , $T_s$) for each of the one or more counterparties s.

9. A computer program product stored on a non-transitory computer readable medium for evaluating auction bids in an auction with I items and S counterparties, where each item i is subdivided into Q units, the computer program product comprising:

code to accept a plurality of bids, each bid being a bid $B_{is}$ ($q_s$) representing the cost of a quantity $q_s$ of item i from counterparty s;

code to generate a directed graph from a source vertex to a sink vertex representing the plurality of bids, the graph defined by a single set of rules for all I items; and code to identify the k-shortest paths from the source vertex to the sink vertex representing the k best solutions to accepting bids to obtain each item, where k is an integer ≦2;

wherein the code to generate a directed graph comprises:
code to generate the source vertex and the sink vertex;
code to generate a plurality of intermediate vertices (i, s, q) for each item i where i=1, 2, . . . . I, for each counterparty s where s=1, 2, . . . S, and for each possible quantity q, where q is the total quantity of units of item i supplied by counterparties from counterparty 1 up to and including counterparty s and where q=0, 1, . . . Q.

10. The computer program product according to claim 9, wherein the code to generate a directed graph further comprises code to generate edges representing each bid, each edge being an ordered edge from the source vertex or one of the intermediate vertices towards the vertex (i, s, q) of length $B_{is}$ ($q_s$) representing a cost of a quantity $q_s$ of item i by counterparty s.

11. The computer program product according to claim 10, wherein the code to generate edges further comprises:

code for providing an edge of length $B_{is}$ ($q_s$) from each vertex (i, s, q) to (i, s+1, q+$q_s$) for each s<S−1 and $q_s$≦Q−q;

code for providing an edge labeled (Q−q) of length $B_{is}$ (Q−q) from each vertex (i, S−1, q) for 0<i≦I; and code for providing an edge labeled $q_1$ of length $B_{(i+1)1}$($q_1$) from each vertex (i, S, Q) to (i+1, 1, $q_1$) for each 0≦i<I and $q_1$ ≦Q; and wherein the code to generate the source vertex and the sink vertex further comprises identifying the source vertex as and identifying the final vertex (I, S, Q) as the sink vertex or connecting the vertex (I, S, Q) to the sink vertex with a path of length 0.

12. A computer program product according to claim 10, wherein each vertex is labeled with an additional variable x, where x is an element of a set X, so that the vertices are labeled (i, s, q, x), wherein the variables x are used to represent a constraint on the identification of the k-shortest paths.

13. A computer program product according to claim 12, wherein each vertex (i, s, q, x) is connected to a vertex (i, s+1, q+$q_s$, x') for each s<S−1 and $q_s$ <=Q−q where x' is an element of X, x' is a function of a rule representing the constraint which determines x' from one or more of i, s, q, s, q' and x; and any edges which do not meet the constraint are omitted.

14. A computer program product according to claim 12 wherein the constraint is that the set of counterparties supplying non-zero quantities is an element of a set S of counterparties and wherein X is given by X={*; x: x ⊂ σ' and σ'∈S } where {*} is a special element, the method comprising:

providing an edge of length $B_{is}$ ($q_s$) connecting each vertex (i, s, q, x) to (i, s+1, q+$q_s$, x') for each s<S−1 and $q_s$ ≦Q−q for a particular value of x' except where the edge is omitted as defined below, where x'=x if the edge is labeled 0, x'=x ∪{s+1} otherwise, and if the edge is not labeled 0 and x' as defined is not an element of X, the edge is omitted;

providing an edge labeled (Q+q) of length $B_{is}$ (Q+q) connecting each vertex (i, S-I, q, x) to (i, S, Q, x') for 0<i≦I and a particular value of x unless the edge is omitted, where x'=x if the edge is labeled 0, x'=x ∪{S} otherwise, and if the edge is not labeled 0 and x' as defined is not an element of X, the edge is omitted;

providing an edge labeled $q_1$ of length $B_{(i+1)1}$ ($q_1$) connecting each vertex (i, S, Q, x) to (i+1, 1,$q_1$,x') for each 0≦i<I and $q_1$ ≦Q where x'=x if the edge is labeled 0, x'=x ∪{1} otherwise, and if the edge is not labeled 0 and x' as defined is not an element of X, the edge is omitted; and providing an edge connecting (i , S, Q, x) to the sink with a single edge of length 0 if and only if x is in S.

15. A computer program product according to claim 12, wherein the constraint is a requirement that one or more counterparties s supply a minimum total quantity $T_s$;

X is a product of the sets $(0, \ldots, T_s)$ for each of the one or more counterparties s, the rule determining x' is x'=min $(T_s, x+q_1)$;

and of the vertices (I, S, Q, x), only those vertices for which $x_s = T_s$ for each s are connected to the sink.

16. A computer program product according to claim 12, wherein the constraint is a requirement that one or more counterparties s supply a maximum total quantity $T_s$ and X is a product of the sets $(0, \ldots, T_s)$ for each of the one or more counterparties s.

17. An auction apparatus to auction I items among S counterparties, each item i being subdivided into Q units, the apparatus to accept a plurality of bids, each bid being a bid $B_{is}$ $(q_s)$ representing a cost of a quantity $q_s$ of item i from counterparty s, the apparatus comprising:

a formulation module stored in memory and executed by a processor to generate a directed graph from a source vertex to a sink vertex representing the plurality of bids; and a solutions determination module to identify, based on the generated directed graph, k bids that correspond to k shortest paths from the source vertex to the sink vertex, where k is an integer $\geq 2$;

wherein the directed graph is defined by a single set of rules for all I items and includes a plurality of intermediate vertices (i, s, q), wherein:

i represents an item, i=1, 2, ... I;

s represents a counterparty, s=1, 2, ... S; and q represents a number of units already supplied by counterparties from counterparty 1 up to and including counterparty s where q=0,1, ... Q.

18. The auction apparatus according to claim 17, wherein to generate the directed graph, the formulation module generates:

a plurality of intermediate vertices (i, s, q) for each item i where i=1, 2, .... I, for each counterparty s where s=1, 2, ... S, and for each possible quantity q where q=0,1, ... Q, when s=S and q=Q; and edges representing each bid, each edge being an ordered edge from the source vertex or one of the plurality of intermediate vertices towards the vertex (i, s, q) of length $B_{is}$ $(q_s)$ representing a cost of a quantity $q_s$ of item i by counterparty s where q is a total quantity of units of item i supplied by counterparties from counterparty 1 up to and including counterparty s.

* * * * *

UNITED STATES PATENT AND TRADEMARK OFFICE
CERTIFICATE OF CORRECTION

PATENT NO. : 8,275,669 B2  Page 1 of 1
APPLICATION NO. : 13/197993
DATED : September 25, 2012
INVENTOR(S) : Andrew Robert Byde It is certified that error appears in the above-identified patent and that said Letters Patent is hereby corrected as shown below:

In column 8, line 33, in Claim 1, delete "auction-and" and insert -- auction and --, therefor.

In column 8, line 58, in Claim 3, delete "(i, s+1,q+$q_s$)" and insert -- (i, s+1, q+$q_s$) --, therefor.

In column 8, lines 62-63, in Claim 3, delete "$q_1$ Q;" and insert -- $q_1 \leqq Q$; --, therefor.

In column 9, line 24, in Claim 6, delete "(i, S-I, q, x)" and insert -- (i, S-1, q, x) --, therefor.

In column 9, line 29, in Claim 6, delete "($q_i$)" and insert -- ($q_1$) --, therefor.

In column 9, line 30, in Claim 6, delete "(i+1, 1,$q_1$,x')" and insert -- (i+1, 1, $q_1$, x') --, therefor.

In column 9, line 43, in Claim 7, delete "$x_s$ =$T_s$" and insert -- $x_s$=$T_s$ --, therefor.

In column 10, line 22, in Claim 11, delete "$q_1 \leqq Q$;" and insert -- $q_1 \leqq Q$; --, therefor.

In column 10, line 52, in Claim 14, delete "(Q+q)" and insert -- (Q-q) --, therefor.

In column 10, line 52, in Claim 14, delete "$B_{is}$ (Q+q)" and insert -- $B_{is}$ (Q-q) --, therefor.

In column 10, line 53, in Claim 14, delete "(i, S-I, q, x)" and insert -- (i, S-1, q, x) --, therefor.

In column 10, line 59, in Claim 14, delete "(i+1, 1,$q_1$,x')" and insert -- (i+1, 1, $q_1$, x') --, therefor.

In column 10, line 63, in Claim 14, delete "(i , S, Q, x)" and insert -- (i, S, Q, x) --, therefor.

In column 11, line 5, in Claim 15, delete "$x_s$ =$T_s$" and insert -- $x_s$=$T_s$ --, therefor.

In column 11, line 11, in Claim 17, delete "among" and insert -- and --, therefor.

Signed and Sealed this
Twelfth Day of February, 2013

Teresa Stanek Rea
*Acting Director of the United States Patent and Trademark Office*